United States Patent [19]
Castro et al.

[11] Patent Number: 5,631,550
[45] Date of Patent: May 20, 1997

[54] DIGITAL CONTROL FOR ACTIVE POWER FACTOR CORRECTION

[75] Inventors: William D. Castro, Louisville; Donald F. Zwolsky, Medina, both of Ohio

[73] Assignee: Lockheed Martin Tactical Defense Systems, Akron, Ohio

[21] Appl. No.: 638,970

[22] Filed: Apr. 25, 1996

[51] Int. Cl.$^6$ .............................. G05F 1/40; G05F 1/56; G05F 5/00

[52] U.S. Cl. ............................................. 323/283; 323/205

[58] Field of Search ................................... 323/205, 217, 323/283, 322

[56] References Cited

U.S. PATENT DOCUMENTS

| | | | |
|---|---|---|---|
| 4,761,725 | 8/1988 | Henze | 232/283 |
| 5,349,522 | 9/1994 | Konishi et al. | 323/205 |
| 5,391,976 | 2/1995 | Farrington et al. | 323/207 |
| 5,483,148 | 1/1996 | Torrey | 323/205 |
| 5,530,635 | 6/1996 | Yashiro | 323/205 |

*Primary Examiner*—Stuart N. Hecker
*Attorney, Agent, or Firm*—Renner, Kenner, Greive, Bobak, Taylor & Weber

[57] ABSTRACT

A digitally controlled active power factor corrected preregulator wherein a rectifier receives an alternating current voltage and generates an alternating line current and corresponding alternating line voltage with an optimum power factor. A power converter receives the alternating line current from the rectifier and converts it to a direct current and corresponding direct current voltage by virtue of a digital controller which adjusts the waveshape of the alternating line current to match the waveshape of the alternating line voltage to minimize line current distortion of the direct current. The digital controller includes a comparator for determining a difference between a reference voltage input and the direct current voltage to generate an error signal that is correlated by a look-up table to generate a correction signal. A digital pulse width modulator employs the correction signal and the alternating line current to generate a pulse width modulation signal that is received by the power converter to extend the conduction time of the rectifier throughout the cycle of the alternating current voltage. The pulse width modulator, which is programmable for different variables, includes a register for receiving a digital representation of the correction signal to generate an output received by a counter, wherein a plurality of flip-flops generate a duty cycle. The counter is decremented from the value of the register output by toggling the plurality of flip-flops according to a switching frequency so that the duty cycle enables the conduction of the rectifier while the counter is decremented and disenabling the conduction of the rectifier when the counter is at zero. The digital controller is adaptable for use with various power topologies, with or without power factor correction, and with motor controllers and motion controllers.

13 Claims, 3 Drawing Sheets

DIGITAL CONTROL FOR ACTIVE POWER FACTOR CORRECTION

TECHNICAL FIELD

The invention herein resides generally in the art of digital controllers with digital pulse width modulators employed to process input variables and generate an output that correlates to a fixed frequency pulse width modulated signal. Specifically, the present invention relates to a digital controller with a digital pulse width modulator that is adaptable for use as an active power factor corrected preregulator, or in conjunction with a power converter, or both.

BACKGROUND ART

In power systems it is known that optimum performance is obtained when the power factor—the ratio of real power to apparent power—is as close to 1.0 as possible. To obtain this optimum power factor, the alternating input current must be in phase and of the same waveshape as the alternating input voltage. Various circuits are known to achieve a power factor of about 0.9 or less. This less than optimal power factor is typically caused by the effect of non-linear rectifier input circuits. For example, in single phase alternating current switching power supplies, also known as power converters, the rectifiers only conduct at the peak AC voltage such that the instantaneous current charging a connected storage capacitor is much larger than the direct current load. The switching power supply draws current from the AC line in short pulses near the peaks of the AC sinusoidal voltage waveshape during the rectifiers forward induction. The resulting input line current distortion is caused by the effect of the non-linear rectifier input circuit. These switching power systems, with less than an ideal power factor, have numerous problems. In particular, line current distortion: (1) reduces the efficiency of the AC power system; (2) requires an increase in line currents to obtain the desired output power; (3) increases line voltage distortion, cross talk and electromagnetic interference; and (4) causes mechanical wear and acoustical noise in the generating equipment.

Currently, there are several methods for optimizing the power factor. This is typically done by means of a circuit between the power supply and the load, wherein the circuit reshapes the input current pulse into a near sinusold waveshape. The two most common methods for achieving this are by employing multi-tap transformers or active power factor corrected preregulators.

The multi-tap transformers are employed with a three-phase power system to minimize and widen the peak rectifier currents. These peak rectifier currents may also be further reshaped by filter inductors. By employing multi-tap transformers, the input current is reshaped into a series of trapezoids that closely resemble the sinusoidal input voltage waveshape. Accordingly, as the number of taps are increased, the number of steps in the waveshape are increased, resulting in a reduction of the total harmonic distortion. This method of power factor correction is typically employed in switching power supplies between the 10 kilowatt to 100 kilowatt range.

Active power factor corrected preregulators can be used on either single phase or multiple phase alternating current inputs. For single phase operation, an active power factor corrected preregulator reshapes the input current into a sinusoid by using a high frequency, pulse width modulated (PWM) power converter. Power converters can employ either a boost, buck, or flyback topology. As is well known, a boost topology or step-up converter produces a higher voltage at the load than the supply voltage. A buck topology or step-down converter produces a lower voltage at the load than the supply voltage and the flyback topology allows for generating a higher or lower voltage at the load as required. Typically, the PWM power converter forces a rectifier within the preregulator to conduct throughout the entire input voltage cycle and regulates the output DC voltage. The preregulator includes a control circuit which consists of: a sensing circuit to determine the input voltage, the input current and the output voltage; and an analog circuit to generate an error signal that is submitted to the pulse width modulator. Depending on the desired configuration of the power converter, different control schemes for the pulse width modulation are voltage mode control, current mode control and voltage feed-forward control. The control circuit employs analog computational methods to determine the duty cycle of the pulse width modulator power converter. For three-phase operation, it is known to employ three single phase active power factor corrected preregulators in a parallel-redundant mode. If one of the preregulators were to fail, the other two preregulators continue to operate to maintain the required output.

Although this existing technology has improved the power factor for power converters, these methods have drawbacks particular to each approach. The multi-tap transformers require the use of bulky transformers and associated analog components. In particular applications it has been found that the size and complexity of these type of power factor correction devices is unacceptable. The active power factor corrected preregulators, while an improvement over the multi-tap transformers, still require dedicated integrated circuits and analog computational circuitry for each phase of operation. As such, if one of the preregulators or one of the phases is rendered inoperative, the phase load becomes unbalanced and causes detrimental line harmonics. Moreover, none of the existing technology provides for easy adaptation to different types of inputs or outputs. It will also be appreciated that these analog type controllers are noise sensitive and difficult to stabilize due to the electrically noisy areas in which they operate. Additionally, digital current PWM converters have a limited frequency range of up to about 30 Khz.

Based upon the foregoing, it is evident that there is a need in the art for a digital controller with a digital pulse width modulator employed in an active power factor preregulator. Furthermore, there is a need for a digital controller with a digital pulse width modulator that can be used with different types of power converters, which is programmable and which is unaffected by electrical noise. There is also a need for a digital controller with a digital pulse width modulator which provides an optimum power factor in any type of power converter.

DISCLOSURE OF INVENTION

In light of the foregoing, it is a first aspect of the present invention to provide a digital controller with a digital pulse width modulator which can process various input variables and generate an output that correlates to a fixed frequency pulse width modulated signal.

Another aspect of the present invention is to provide a digital controller, as set forth above, which is employed with an active power factor corrected pre-regulator.

Still a further aspect of the present invention is to provide a digital controller, as set forth above, which is adaptable for use with a pre-regulator and a power converter.

Still a further aspect of the present invention is to provide a digital controller with a pre-regulator as set forth above, wherein an optimum power factor is obtained, thus reducing the overall maximum current required to power the direct current load, which allows the size of the load to be increased while reducing the total harmonic distortion to less than ten percent.

An additional aspect of the present invention, as set forth above, is to provide a digital controller with a preregulator wherein the line voltage distortion and cross talk are substantially reduced.

A further aspect of the present invention is to provide a digital controller with a preregulator, as set forth above, wherein electromagnetic interference is substantially reduced.

Another aspect of the present invention is to provide a digital controller with a preregulator, as set forth above, which has increased reliability and stability to allow for a reduction in size of the power converter by eliminating transformers and other analog components.

Still a further aspect of the present invention is to provide a digital controller with a preregulator, as set forth above, wherein the connected power converter operates from 500 to 10,000 watts.

Yet a further aspect of the present invention is to provide a digital controller with a preregulator and a power converter, as set forth above, which is easily adapted to various power levels.

Still yet a further aspect of the present invention, as set forth above, is to provide a digital controller with a digital pulse width modulator that operates at frequencies between about 20 khz and about 200 khz.

Still another aspect of the present invention is to provide a preregulator with a digital controller, as set forth above, wherein the digital controller is programmable to adjust for the input and output voltage levels required by the power converter.

The foregoing and other aspects of the invention which shall become apparent as the detailed description proceeds, are achieved by a digitally controlled active power factor corrected preregulator, comprising: a reference signal; a plurality of input signals; means for conditioning said plurality of input signals to generate a corrected output signal; and a digital controller for receiving said reference signal, said plurality of input signals and said corrected output signal, said digital controller generating a pulse width modulation signal received by said conditioning means to control the operation thereof.

The present invention also provides an a digitally controlled active power factor corrected preregulator for transforming power from a primary source to a desired output, comprising: a primary source of electrical power; means for conditioning said primary source and generating a corrected output signal; and means for controlling said corrected output signal, wherein said controller means is connected to said conditioning means and receives both said primary source and said corrected output signal, wherein said controlling means adjusts said primary source to obtain said corrected output signal.

BEST MODE FOR CARRYING OUT THE INVENTION

Figure 1:
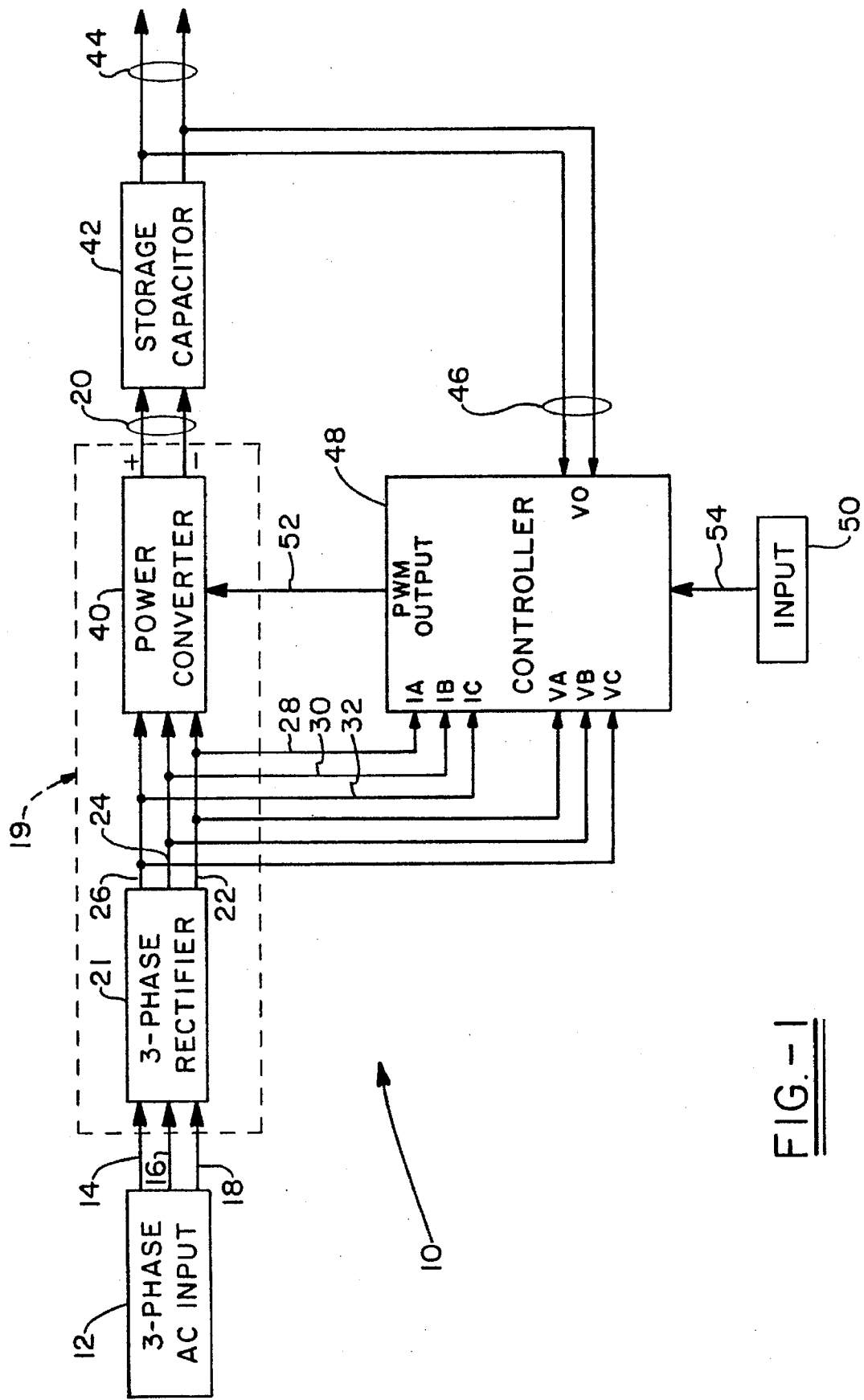
FIG. 1 is a block diagram of an active power factor corrected preregulator employing a digital controller.

Referring now to the drawings and more particularly to FIG. 1, it can be seen that a digitally controlled active power factor corrected preregulator according to the present invention is designated generally by the numeral 10. The preregulator 10 receives a primary source of electrical power such as a three-phase alternating current input 12 which has an alternating current voltage comprising a phase A 14, a phase B 16 and a phase C 18. All three phases, 14, 16 and 18, are received by a power conditioner 19 that generates a corrected output signal 20. Although three phases are shown in this embodiment, it will be appreciated that the preregulator 10 is adaptable to any number of phases.

A rectifier 21 is included in the power conditioner 19 for the purpose of receiving the alternating current voltage and generating an alternating line current and a corresponding alternating line voltage. In particular, the alternating line voltage is identified for each phase generated as a voltage A 22, a voltage B 24 and a voltage C 26. Likewise, the rectifier 21 generates an alternating line current for each phase. In particular, the rectifier 21 generates an alternating line current A 28, an alternating line current B 30 and an alternating line current C 32.

A power converter or switching power supply 40, which is also included within the power conditioner 19, receives each phase of the alternating voltage 22–26 and each phase of the alternating current 28–32. In the present embodiment, the power converter 40 converts these alternating voltages and currents to generate a direct current with a corresponding direct current voltage. Other embodiments could include a power converter that transforms a direct current source to a regulated direct current output. As will be discussed hereinbelow, various types of topologies can be implemented with the power converter 40. It should also be appreciated that the preregulator 10 could be presented without a power converter 40 if so desired. In any event, the power conditioner 19 generates a corrected output signal 20 that corresponds to the particular topology employed. Those skilled in the art will appreciate that the power converter 40 has a positive and a negative output terminal.

A storage capacitor 42, as seen in FIG. 1, is connected across the positive and negative terminals of the power converter 40 for the purpose of filtering any spurious electrical noise or unwanted transient signals from the corrected output signal 20. In the embodiment presented, the storage capacitor 42 generates a direct current output voltage 44 and a corresponding voltage feedback signal 46 that is received by a digital signal process controller 48. Of course, the corrected output signal 20 could be connected directly to the controller 48.

The controller 48, which in the preferred embodiment is an Altera 7000 Series Programmable Logic Device, receives operator input 50 and outputs a pulse width modulation signal 52 to adjust the waveshape of the alternating line currents 28–32 to match the waveshape of the alternating line voltages 22–26, thus minimizing line current distortion of the direct current output voltage 44. The operator input 50 includes, but is not limited to, the input current and voltage values, desired output voltage values, gain values and system thresholds. Generally, the PWM signal 52 of the controller 48 forces the rectifier 21 to conduct throughout the input voltage cycle. This forces the waveshape of the line current to match the waveshape of the line voltage and provide a power factor as close to 1.0 as possible. The operator input 50 allows the controller 48 to be programmed to adjust to various alternating current inputs and to generate a desired voltage output 44. As such, the preregulator 10 is adaptable to different types of input power supplies while reducing line harmonic distortion and increasing power output. Accordingly, the controller 48 can be employed with or without power factor correction, and with motor controllers and motion controllers. By virtue of employing a programmable controller, any type of power modification circuit connected thereto provides better resolution, easier operation at higher switching frequencies and easier modification to other topologies and applications wherein these features are unattainable by any one type of analog controller.

Figure 2:
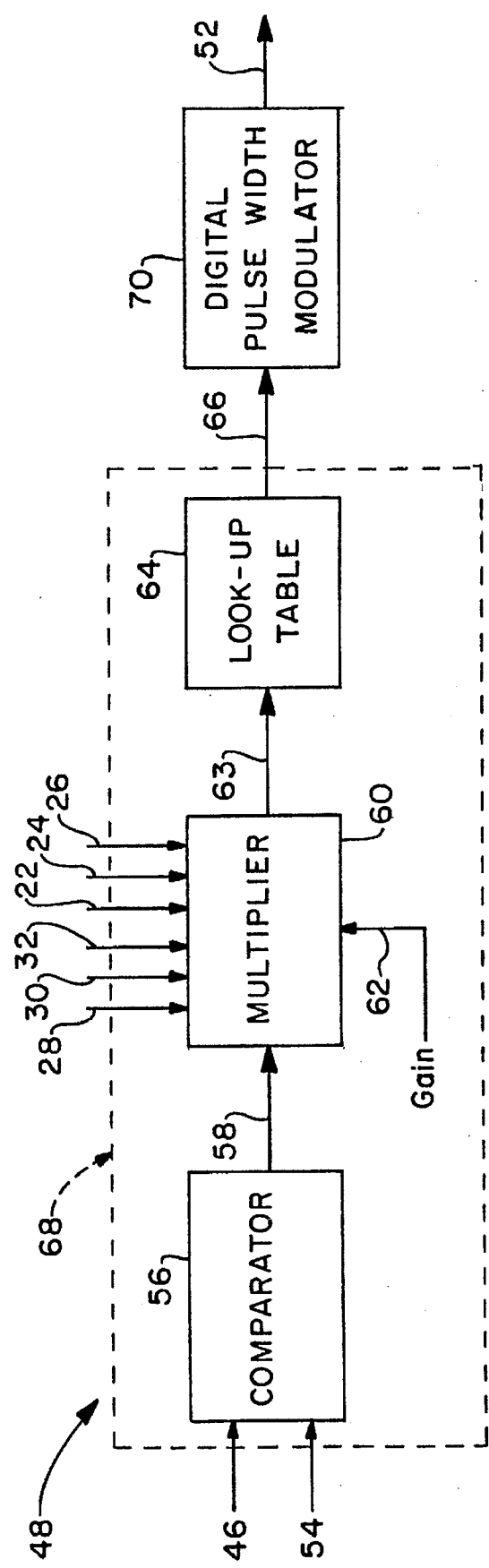
FIG. 2 is a block diagram of a digital signal process controller employed in conjunction with the active power factor corrected preregulator.

Referring now to FIG. 2, a block diagram of the controller 48 is presented. In the preferred embodiment, the controller 48 receives the voltage feedback signal 46 and a reference voltage signal 54 which is derived from the operator input 50. In particular, a comparator 56 receives the reference voltage signal 54 and the voltage feedback signal 46, wherein the difference therebetween equals an output voltage error signal 58. A multiplier 60, which performs mathematical processing, receives the error signal 58, the values for the alternating voltages 22–26 and the values for the alternating currents 28–32 for multiplication by a gain factor 62 which is generated by the operator input 50. The multiplier 60 generates a modified error signal 63 that is received by a look-up table 64 which performs linear and nonlinear transfer functions depending upon the relationship of the state variables (input/output voltages currents and corresponding phases) to the error signal 58. This allows for the various power topologies (boost, buck and flyback) and control methods (voltage mode, current mode and voltage feed forward mode control) to be implemented. In other words, the output of the multiplier 60 is received by a look-up table 64 for correlation to the proper input current waveshape and the proper output voltage and wherein the look-up table 64 outputs a correction signal 66. Accordingly, by determining the error signal 58, the controller 48 adjusts the waveshape of the alternating line current to match the waveshape of the alternating line voltage to minimize line current distortion. It will be appreciated that the comparator 56, the multiplier 60 and the look-up table 64 provide a correction device 68 for correcting the alternating line current whenever it varies from the waveshape of the alternating line voltage.

A digital pulse width modulator 70 receives the correction signal 66 from the look-up table 64 for generating the pulse width modulation signal 52 that is received by the power converter 40. If a power converter 40 is not employed, the PWM signal 52 is received by the power conditioner 19 to modify the various input variables to generate the desired output signal. In this embodiment, the pulse width modulation signal 52 functions to extend the conduction time of the rectifier 21 throughout the phases of the alternating current voltages 22–26 with a duty cycle control of between about 5% to about 45%.

Figure 3:
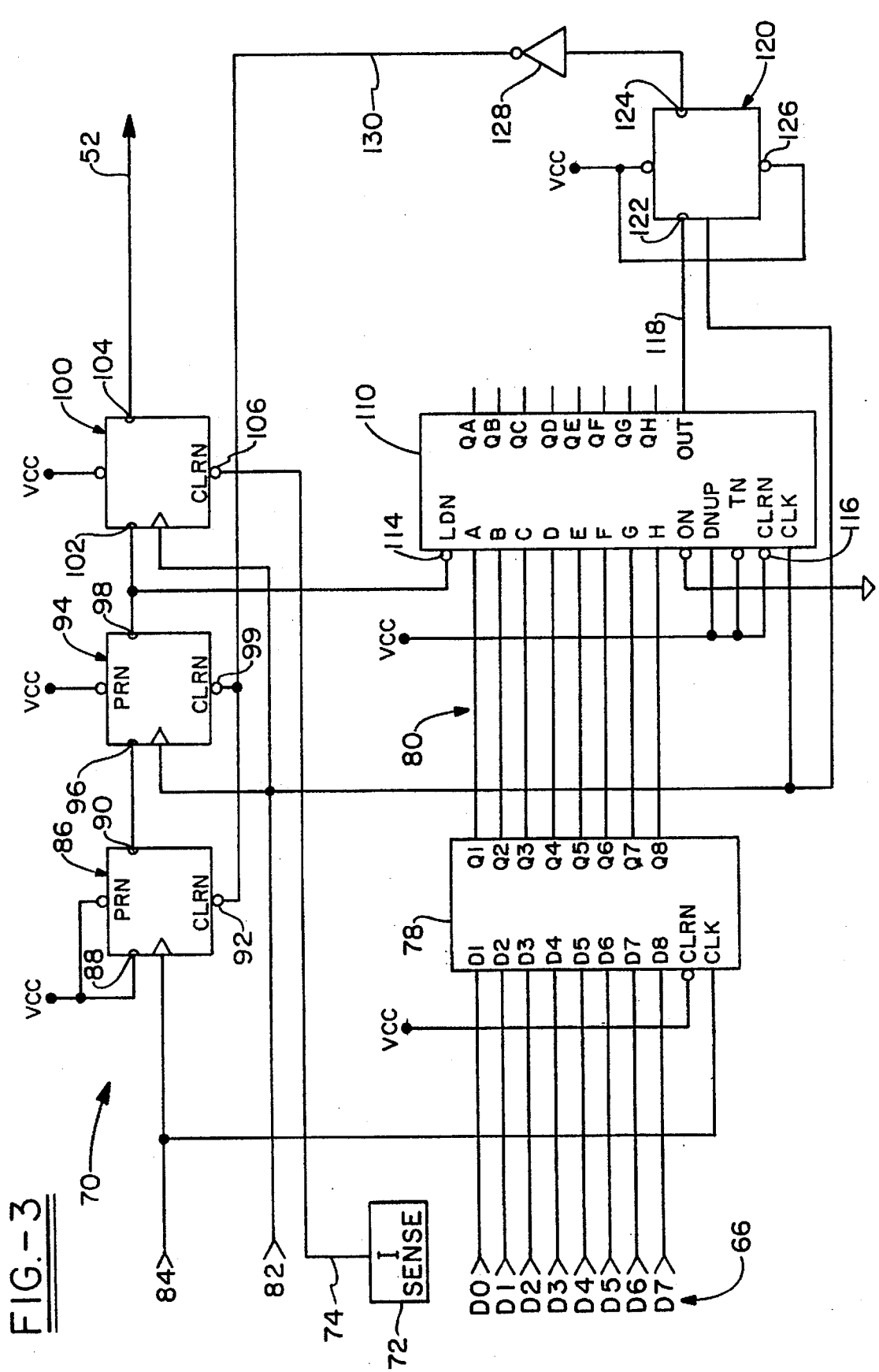
FIG. 3 is a system architecture diagram of a digital pulse width modulator contained within the digital controller.

Referring now to FIG. 3, the architecture of the digital pulse width modulator 70 is shown. Connected to the digital pulse width modulator 70 is a current sense circuit 72 which functions to monitor the direct current and disenables the conduction of the rectifier 21 whenever the direct current exceeds a predetermined level. The current sense circuit 72 provides protection for the preregulator 10 as well as other circuitry and devices connected thereto. The current sense circuit 72 generates an over-current signal 74 that is monitored by the modulator 70 for such purpose. Also received by the modulator 70 is a digital representation of the correction signal 66. In particular, an eight bit register 78 receives the digital error signal 66 to provide a stable input of corresponding signals 80 to a counter circuit. As will be appreciated by those skilled in the art, the modulator 70 employs a master clock signal 82 and a switch frequency 84. The master clock signal operates the programmable logic device with a maximum clock frequency of about 40 Mhz. Dividing the master clock signal 82 by 400, yields a switch frequency of about 100 khz. It will be appreciated that depending upon the requirements of other embodiments, the switch frequency could range between about 20 khz to about 200 khz. Both the master clock signal 82 and the switch frequency 84 are received by a plurality of D-type flip-flops for generating the pulse width modulation signal 52, wherein the plurality of flip-flops are toggled to enable the conduction of the rectifier 21. In particular, the plurality of flip-flops include a flip-flop 86 which has an input 88, an output 90 and a clearance terminal 92. Connected to flip-flop 86 is a flip-flop 94 which has an input 96, an output 98 and a clearance terminal 99. Connected to flip-flop 94 is a flip-flop 100 that has an input 102, an output 104 and a clearance terminal 106. Also connected within the pulse width modulator 70 is an eight bit counter 110 that has input terminals 112 designated as A-H in FIG. 3, an LDN terminal 114, a clearance terminal 116 and a COUT terminal 118. Electrically connected to the eight bit counter 110 is a flip-flop 120 which has an input 122, an output 124 and a clearance terminal 126. Electrically connected to the output 124 is a NOT gate 128 that generates a signal 130 that is connected to the clearance terminals 92 and 99 of the flip-flops 86 and 94, respectively.

The switching frequency 84 is received by the first flip-flop 86 and the register 78. The master clock signal 82 is received by the flip-flops 94, 100, 120 and the counter 110. As those skilled in the art will appreciate, a voltage source designated as $V_{cc}$ operates the flip-flops 86, 94, 100 and 120, the register 78 and the counter 110. In particular, $V_{cc}$ is connected to input 88 while the output 90 is connected to the input 96 of the flip-flop 94. The output 98 of flip-flop 94 is connected to the input 102 of the flip-flop 100 and the LDN terminal 114 of counter 110. The COUT signal terminal 118 is connected to the input 122 of flip-flop 120 while $V_{cc}$ is connected to the clearance connection 126 of flip-flop 120.

During operation, it will be appreciated that the digital pulse width modulator 70 generates an output signal 52 with a frequency of about 100 khz which provides 160 counts difference between a duty cycle of about 5 percent and about 45 percent of the output signal 52. This duty cycle results in about a 25 nanosecond resolution in pulse width or about 0.625 percent of the duty cycle over this range. Initially, the outputs of the flip-flops 90, 98, 104 and 124 are set in a low condition. Therefore, as the register 78 latches the digital error signal 66, the leading edge of the switching frequency 84 generates a stable input signal 80 received by the eight bit counter 110. The flip-flops 86 and 94 delay the rising edge of the switching frequency 84 from reaching the LDN terminal 114 one period of the master clock signal 82 to allow for the stable input signal 80 to be received at the counter inputs designated as A-H. At this time, the counter 110 is in a parallel load mode while the LDN terminal 114 is low and enters a count mode when the LDN terminal 114 goes high. As those skilled in the art will appreciate, the data present at the inputs A-H becomes the starting count. Accordingly, the counter 110 decrements on each leading edge of the master clock signal 82 until such time as the counter reaches zero. Once the counter 110 reaches zero, the COUT signal 118 goes to a high condition. At the next leading edge of the master clock signal 82, the high COUT signal 118 is latched at the output 124 of flip-flop 120. The NOT gate 128 inverts this signal to generate a NOT signal 130 which is in a low condition and which is received by the clearance inputs 92 and 99 of the flip-flops 86 and 94, respectively. Accordingly, the LDN terminal 114 is driven into a low condition thus terminating the count mode and re-entering the parallel load mode. The input 102 of the flip-flop 100 is also set to a low condition such that the next leading edge of the master clock signal 82 produces a low signal at the output 104, thus terminating the active portion of the duty cycle as represented by the PWM output signal 52. When the counter 110 re-enters the parallel load mode, the COUT signal 118 returns to a low condition and with the next leading edge of the master clock signal 82, the output 124 of flip-flop 120 returns to a low condition, in turn providing a high signal at the clearance inputs 92 and 99 preparing the modulator 70 for the next cycle of switching frequency 84.

Based upon the above description of the operation of the pulse width modulator 70 it will be appreciated that the register 78 receives a digital representation of the correction signal 66 and generates corresponding register signals 80 that are received by a counter 110. The plurality of flip-flops 86, 94, 100 and 120 and the NOT gate 128 generate a pulse width modulation signal 52 with a corresponding duty cycle wherein the counter 110 is decremented from the value of the register output by toggling the plurality of flip-flops according to the switching frequency 84 and the master clock signal 82. As such, the plurality of flip-flops 86, 94, 100 and 120 generate a pulse width modulation signal 52 enabling the conduction of the rectifier 21 while the counter 110 is decremented and disenabling the conduction of the rectifier 21 when the counter 110 is at zero. Therefore, those skilled in the art will appreciate that the digital pulse width modulator 70 is responsive to the value of the output voltage 44 and accordingly the value of the voltage feedback signal 46 so that any variation in the line voltages constrain the rectifier 21 to maintain a line current that is of the same waveshape as the line voltage.

Figure 4B:
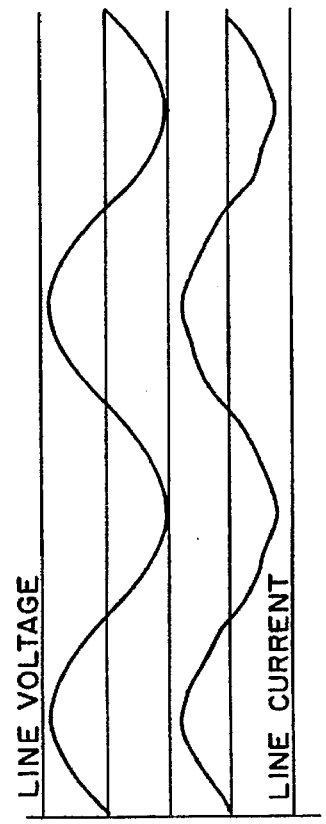
FIG. 4B illustrates a voltage and current waveform of a power converter with power conditioning.
Figure 4A:
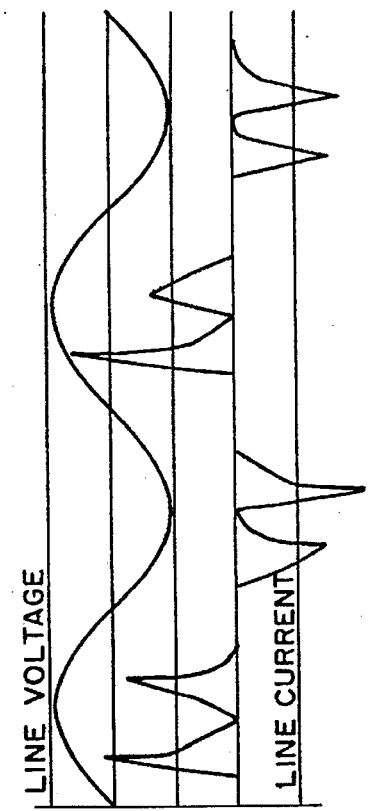
FIG. 4A illustrates a voltage and current waveform of a power converter without power conditioning.

It can be seen that FIG. 4A illustrates the current and voltage waveshapes of an alternating current to direct current switching supply wherein the line voltage is provided in a sinusoidal shape, but where the rectifier is only conducting at peak portions. As a result, excessive total harmonic distortion and increased electromagnetic interference are realized. Moreover, it will be appreciated that in order to supply the necessary voltage to a direct current load, the line current must be increased accordingly. However, by providing the conditioning circuitry of the present invention it can be seen that in FIG. 4B the line current waveshape matches the line voltage waveshape. Accordingly, the preregulator 10 provides a total harmonic distortion of about 4.5 percent and power to a direct current load that requires less current to operate at the same level of performance as the load shown without the power conditioning.

It is apparent then from the above description of the operation and structure of the preregulator 10 that the problems associated with previous power converters and preregulators have been overcome. In particular, the preregulator 10 reduces the overall maximum current required to operate a connected direct current load. Additionally, by matching the waveshape of the line voltage and line current, the total harmonic distortion of the power converter in the present embodiment is reduced to less than 10 percent. By employing a digital signal processor controller 48, the need to use heavy and bulky transformers or analog circuit components is eliminated, thereby reducing the size and weight of the active power factor corrected preregulator and the power converter.

Additional advantages of the present invention are realized by virtue of reducing the total harmonic distortion and the related electromagnetic interference. Since the digital pulse width modulator operates at frequencies of up to about 200 khz, the necessary fine resolution of the line current to match the line voltage is realized. As such, power supplies rated for between 500 to 10,000 watts can be achieved by using the present invention. Still another advantage of the present invention is that the digital controller 48 is programmable to receive various types of alternating current and direct current input and is programmable to adapt to the direct current load attached to the power circuitry. Moreover, the digital controller 48 is quite versatile in that it can be employed in active power factor corrected preregulators and with power converters that may or may not employ power factor correction, motor controllers and motion controllers.

Thus it can be seen that the objects of the invention have been attained by the structure and methods presented above. While in accordance with the patent statutes only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A digitally controlled active power factor corrected preregulator, comprising: a reference signal;
   a plurality of input signals;
   means for conditioning said plurality of input signals to generate a corrected output signal; and
   a digital controller for receiving said reference signal, said plurality of input signals and said corrected output signal, said digital controller generating a pulse width modulation signal received by said conditioning means to control the operation thereof.

2. The preregulator according to claim 1, wherein said digital controller comprises:
   a comparator for receiving said reference signal and said corrected output signal, wherein the difference between said reference signal and said corrected output signal equals an error signal;
   a multiplier for receiving said error signal and said plurality of input signals to perform predetermined transfer functions and generate a modified error signal;
   a look-up table for receiving said modified error signal and generating a correction signal; and
   a digital pulse width modulator (PWM) for receiving said correction signal and generating a pulse width modulation signal that is received by said conditioning means to adjust said plurality of input signals into said corrected output signal.

3. The preregulator according to claim 2, wherein said plurality of input signals comprise an alternating line current and an alternating line voltage and wherein said corrected output signal is a direct current voltage.

4. The preregulator according to claim 3, wherein said conditioning means comprises:

a rectifier receiving an alternating current voltage and generating said alternating line current and said alternating line voltage; and a power converter for receiving said alternating line current, said alternating line voltage and said pulse width modulation signal, wherein said pulse width modulation signal modifies the waveshape of said alternating line current to match the waveshape of said alternating line voltage to optimize the power factor thereof.

5. The preregulator according to claim 4, wherein said digital pulse width modulator, comprises:

a register for receiving a digital representation of said correction signal, said register generating a register output;

a counter for receiving said register output; and a plurality of flip-flops for generating said pulse width modulation signal, wherein said counter is decremented from the value of said register output by toggling said plurality of flip-flops, said pulse width modulation signal enabling the conduction of said rectifier while said counter is decremented and disenabling the conduction of said rectifier when said counter is at zero.

6. The preregulator according to claim 5, further comprising:

a current sense circuit which monitors said direct current and disenables the conduction of said rectifier whenever said direct current exceeds a predetermined level.

7. The according to claim 6, further comprising:

a multiplier receiving said error signal and a gain signal for multiplying said error signal and said gain signal to generate said correction signal.

8. A digitally controlled active power factor corrected preregulator for transforming power from a primary source to a desired output, comprising:

a primary source of electrical power;

means for conditioning said primary source and generating a corrected output signal; and means for controlling said corrected output signal, wherein said controller means is connected to said conditioning means and receives both said primary source and said corrected output signal, wherein said controlling means adjusts said primary source to obtain said corrected output signal.

9. The preregulator according to claim 8, wherein said conditioning means comprises:

a rectifier receiving said primary source; and a power converter connected to said rectifier, wherein said controlling means generates a pulse width modulation signal received by said power converter, said power converter adjusting said primary source with said pulse width modulation signal to generate a feedback signal corresponding to said corrected output signal, said feedback signal received by said controlling means.

10. The preregulator according to claim 9, wherein said primary source of electrical power is a three-phase alternating current and said corrected output signal is a direct current.

11. The preregulator according to claim 10, wherein said rectifier receives said three-phase alternating current and generates an alternating line current and an alternating line voltage and wherein said controlling means comprises:

correction means for comparing a reference voltage input to said feedback signal and correlating the difference therebetween to generate a correction signal; and pulse width modulation means for receiving said correction signal and generating said pulse width modulation signal received by said conditioning means, wherein said pulse width modulation signal extends the conduction time of said conditioning means to conduct throughout the cycle of said alternating line current to match the waveshape of said alternating line voltage.

12. The preregulator according to claim 11, wherein said pulse width modulation means comprises:

counting means for receiving a digital representation of said correction signal, wherein said counting means enables said conditioning means to conduct for a time period starting from when a value represented by said digital representation of said correction signal is decremented to zero by a master clock signal supplied to said pulse width modulation means.

13. The preregulator according to claim 12, further comprising:

means for sensing said direct current to disenable said conditioning means whenever said direct current exceeds a predetermined level.

* * * * *